(12) United States Patent
Galloway

(10) Patent No.: US 6,246,536 B1
(45) Date of Patent: Jun. 12, 2001

(54) NOTCH FILTERING AS USED IN A DISC DRIVE SERVO

(75) Inventor: Paul A. Galloway, Prior Lake, MN (US)

(73) Assignee: Seagate Technology LLC, Scotts Valley, CA (US)

( * ) Notice: Subject to any disclaimer, the term of this patent is extended or adjusted under 35 U.S.C. 154(b) by 0 days.

(21) Appl. No.: 09/344,632

(22) Filed: Jun. 25, 1999

Related U.S. Application Data

(60) Provisional application No. 60/090,774, filed on Jun. 26, 1998.

(51) Int. Cl.[7] .................................................. G11B 5/596
(52) U.S. Cl. ............................................ 360/78.04; 360/61
(58) Field of Search ............................ 360/67, 61, 65, 360/75, 63, 78.01, 78.04, 62

(56) References Cited

U.S. PATENT DOCUMENTS

| | | | |
|---|---|---|---|
| 4,477,755 | 10/1984 | Rickert | 318/611 |
| 4,697,127 | 9/1987 | Stich et al. | 318/561 |
| 4,945,311 | 7/1990 | Smith | 328/167 |
| 4,963,806 | * 10/1990 | Shinohara et al. | 318/621 |
| 5,155,422 | 10/1992 | Sidman et al. | 318/560 |
| 5,325,247 | 6/1994 | Ehrlich et al. | 360/78.09 |
| 5,369,345 | 11/1994 | Phan et al. | 318/561 |
| 5,404,418 | * 4/1995 | Nagano | 388/806 |
| 5,465,183 | 11/1995 | Hattori | 360/78.9 |
| 5,654,841 | 8/1997 | Hobson et al. | 360/75 |
| 5,867,342 | * 2/1999 | Hattori | 360/78.08 X |
| 6,014,285 | * 1/2000 | Okamura | 360/78.04 |
| 6,034,834 | * 3/2000 | Yoshikawa et al. | 360/75 |

FOREIGN PATENT DOCUMENTS 0 777 215 A2    6/1997   (EP).

* cited by examiner

Primary Examiner—Andrew L. Sniezek
(74) Attorney, Agent, or Firm—Westman, Champlin & Kelly, P.A.

(57) ABSTRACT

A method of filtering the actuator driving energy in a disc drive is provided in which the configuration of a digital notch filter is adapted according to which data head is selected. In one embodiment of the invention, digital notch filter constants corresponding to the resonance frequencies of each individual data head are stored in memory. When a particular data head is selected for reading or writing, the digital notch filter constants corresponding to the selected head are retrieved from memory and provided to a digital notch filter, which filters the driving energy according to the retrieved digital notch filter constants. In addition, a disc drive which implements said method of filtering the actuator driving energy is provided.

18 Claims, 6 Drawing Sheets

NOTCH FILTERING AS USED IN A DISC DRIVE SERVO

CROSS-REFERENCE TO CO-PENDING APPLICATION

This application claims the benefit of U.S. Provisional patent application Ser. No. 60/090,774, entitled "OPTIMIZED NOTCH FILTERING AS USED IN A DISC DRIVE SERVO," filed on Jun. 26, 1998.

FIELD OF THE INVENTION

The present invention relates generally to disc drives. More particularly, the present invention relates to reducing resonant oscillation of the disc drive mechanical structure.

BACKGROUND OF THE INVENTION

A typical disc drive includes one or more discs mounted for rotation on a hub or spindle. A typical disc drive also includes one or more transducers supported by a hydrodynamic air bearing which flies above each disc. The transducers and the hydrodynamic air bearing are collectively referred to as a data head. A drive controller is conventionally used for controlling the disc drive system based on commands received from a host system. The drive controller controls a disc drive to retrieve information from the discs and to store information on the discs.

An actuator operates within a negative feedback, closed-loop servo system. The actuator moves the data head radially over the disc surface for track seek operations and holds the transducer directly over a track on the disc surface for track following operations. A servo controller samples the position of the data heads relative to some reference point and generates an error signal based upon the difference between the actual position and the reference position. This error signal is then used to drive the data head to the desired reference point, typically by demanding a current through a voice coil motor (VCM) which forms part of the actuator.

Information is typically stored on the discs by providing a write signal to the data head to encode flux reversals on the surface of the disc representing the data to be stored. In retrieving data from the disc, the drive controller controls the actuator so that the data head flies above the disc, sensing the flux reversals on the disc, and generating a read signal based on those flux reversals. The read signal is then decoded by the drive controller to recover the data represented by flux reversals stored on the disc, and consequently represented in the read signal provided by the data head.

Thus, a disk drive mechanical structure is composed of multiple mechanical components that are pieced together to form the final disk drive assembly. Each of these components has various resonant modes that if excited by an external energy source will cause the part to physically move at the natural frequencies of oscillation for the component in question. This movement can occur in a bending mode, a twisting mode or a combination of the two. If the component is highly undamped (i.e. the resonance is high amplitude, narrow frequency band) it will tend to oscillate with a minimal external driving energy. This oscillation results in physical motion of the data head, causing off track errors and potential fly height problems. These oscillations are often referred to as "resonances."

If resonances occur in a disk drive, they can severely limit drive performance, both in seek mode and track-follow mode. To obtain the optimal disk drive performance requires that there be no resonances present. However, this scenario is not physically possible. Every mechanical component has a natural frequency of oscillation. Nevertheless, it is desirable to reduce or minimize the resonances. One way of doing this is to mechanically damp the mechanical components and thereby decrease the amplitude of the resonant mode. This can be done by careful design, the end result being a reduction in the amplitude of the oscillation to a level that is deemed acceptable to achieve a desired drive performance.

However, there are situations where a component is not able to be mechanically damped. This could occur, for example, because of materials used or because of design time constraints. When this scenario occurs, the only way to improve drive performance is to make sure that no excitation energy at the natural frequency of oscillation reaches the mechanical component to start it oscillating. The present invention concentrates on this approach.

As mentioned above, typical disc drives demand a current through a voice coil motor (VCM) to drive the data head to the desired position. When a frequency spectrum of demand current is analyzed it is found that the spectrum is composed of frequency components from direct current (DC) all the way up to multiple kilohertz (kHz). If VCM current is driving the actuator at the same frequency as the natural frequency of a mechanical resonant mode of a mechanical component, the energy may be sufficient to excite the mechanical structure into oscillation. This is very undesirable and will at least degrade disk drive performance or at worst will cause the servo system to go unstable.

The method employed by servo engineers to minimize the chances of the mechanics oscillating is to use hardware electronic filtering and/or digital filtering of the VCM current via a microprocessor or digital signal processor. Both types of filters achieve the same overall result They reduce the driving force energy (i.e. the current flowing) at frequencies deemed a concern.

One type of filter that is widely used to remove driving energy at the mechanical resonant modes is known as a notch filter. A notch filter is a band-rejection filter that produces a sharp notch in the frequency response curve of the disc drive. When a notch filter is activated by the servo control loop, the open loop response ends up a summation of the original response plus the notch filter response. If the notch filter is centered about the frequency where the peak amplitude of the mechanical resonance occurs, then the driving force energy at this frequency can be reduced so that there will be little or no energy made available to excite the mechanical structure.

The problem with the notch filter, however, is that if the center frequency of the mechanical resonance does not align with the center frequency of the notch filter then the attenuation of the driving current may not be enough to keep the structure from going into oscillation. This will occur if the mechanical resonance has shifted in frequency. This can easily occur on a drive to drive basis or even from one data head to another.

Present disk drives have fixed notch filters that are designed to cover a spread in mechanics. Such a filter, for example, is described in U.S. Pat. No. 5,032,776. Such filters remove driving energy at frequencies which would not cause the mechanical structure to oscillate for a given head or for a given drive. Thus, they are not optimal solutions. Furthermore, such filters cannot guarantee that the gain of the resonance will remain below 0 dB.

Methods also exist to implement adaptive filtering techniques by implementing digital signal processing algorithms in the servo controller. Such a method, for example, is described in U.S. Pat. No. 5,325,247. Such methods involve complex microcontroller code and are heavy on computational time. Furthermore, such methods cannot also guarantee optimal results under all circumstances.

As disk drive servo systems continually require higher open loop bandwidths to track follow accurately, the requirement for improved filtering techniques increases also. The present invention provides an economical means of providing a high degree of attenuation of the mechanical resonance frequencies and offers other advantages over the prior art.

SUMMARY OF THE INVENTION

The present invention relates to a method and apparatus for providing improved attenuation of the mechanical resonant frequencies in a disc drive.

One embodiment of the present invention is directed to a method of filtering the actuator driving energy to reduce the frequency components which are approximately equal to the resonance frequencies of the disc drive mechanical structure. The method involves selecting one of the data heads for reading or writing and adapting the configuration of a digital notch filter according to which data head is selected.

In one embodiment of the present invention, digital notch filter constants for each data head are stored in memory. The digital notch filter constants define the frequency response of a digital notch filter such that the filter reduces the resonance frequencies. When a particular data head is selected for reading or writing the digital notch filter constants corresponding to the selected data head are retrieved from memory. Then, the actuator driving energy is filtered by implementing the digital notch filter according to the digital notch filter constants retrieved from memory.

Another embodiment of the present invention is directed to a computer disc drive that includes at least one disc, multiple data heads, an actuator, a servo control processor and a digital notch filter. The discs are capable of storing data. The data heads are capable of reading data from and writing data to the discs. The actuator is coupled to the data heads for positioning the data heads relative to the discs in response to driving energy. The servo control processor is coupled to the actuator and is capable of providing driving energy to the actuator. The digital notch filter reduces the frequency components of the driving energy which are close to the resonant frequencies of the disc drive mechanical structure. The servo control processor adjusts the configuration of the digital notch filter according to which data head is selected.

One embodiment of a disc drive according to the present invention includes a data storage device that is accessible by the servo control processor and stores digital notch filter constants which define the frequency response of the digital notch filter for each data head. The servo control processor retrieves the digital notch filter constants corresponding to a newly selected data head from the data storage device when the data head is selected for reading or writing and provides the digital notch filter constants to the digital notch filter.

Yet another embodiment of the present invention is directed to a disc drive that includes an actuator that is driven by driving energy and means for filtering the driving energy to reduce the frequency components which are substantially equal to the resonance frequencies of the disc drive mechanical structure.

These and various other features as well as advantages which characterize the present invention will be apparent upon reading of the following detailed description and review of the associated drawings.

DETAILED DESCRIPTION OF ILLUSTRATIVE EMBODIMENT

Figure 1:
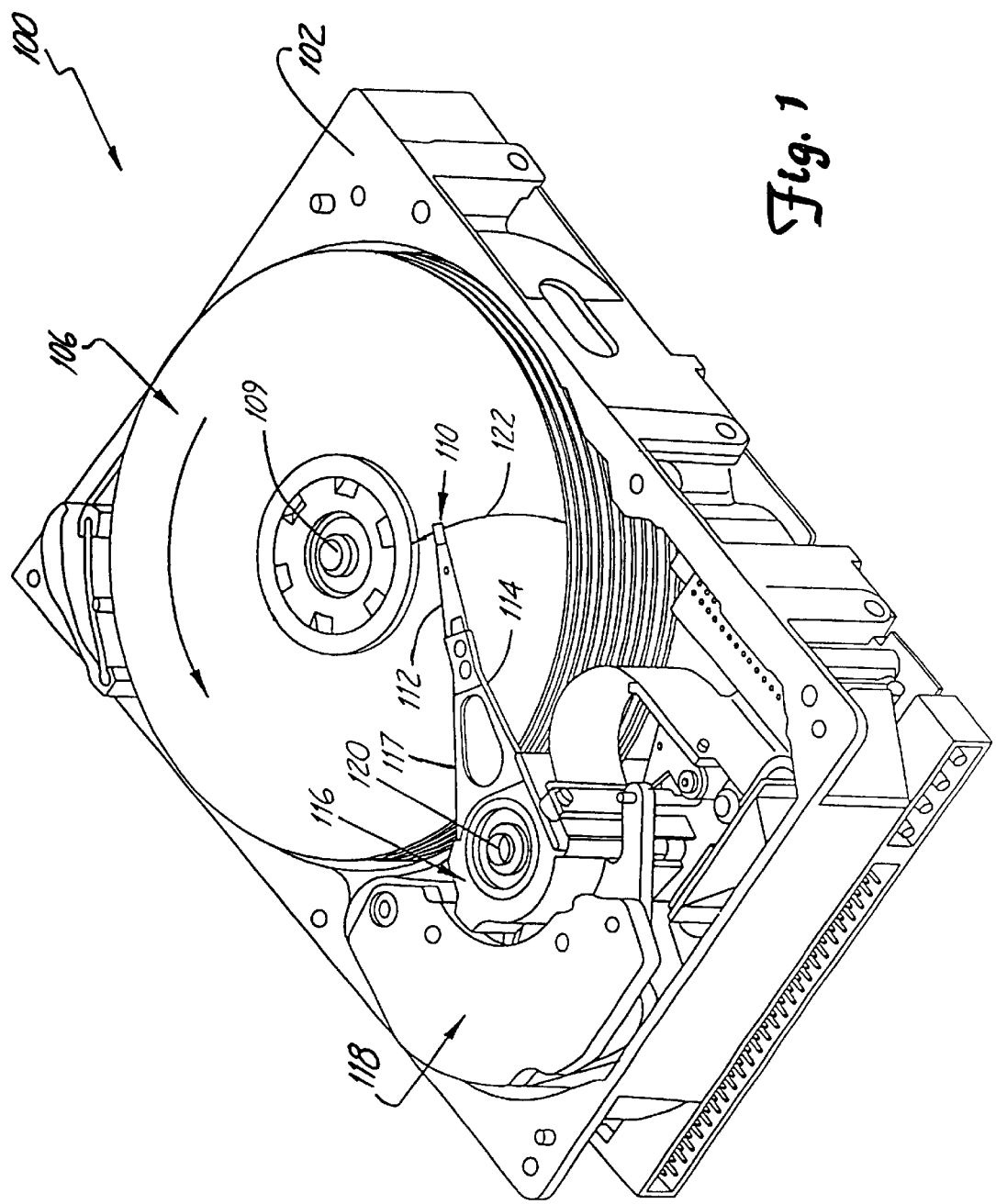
FIG. 1 is a top view of a disc drive 100 in accordance with one embodiment of the present invention.

FIG. 1 is a top view of a disc drive 100 in accordance with one embodiment of the present invention. Disc drive 100 includes a disc pack 106 mounted for rotation about spindle 109. Disc pack 106 includes a plurality of individual discs, each of which include concentric tracks, or cylinders, for receiving and storing data in the form of magnetic flux reversals encoded on the tracks. It should be noted that although the present invention is described herein with reference to a magnetic disc system, the invention is equally applicable to disc drives which utilize discs employing other means of data storage, such as optical discs. Disc drive 100 also includes an actuator 116 mounted to a base 102 and pivotally moveable relative to discs 106 about pivot shaft 120. Actuator 116 includes an actuator arm assembly 117 which includes a plurality of actuator arms 114. Each actuator arm 114 is attached to one or more flexure arms 112. Each flexure arm 112 supports a data head 110. Data head 110 includes a hydrodynamic air bearing, or slider, which supports a transducer for reading information from and encoding information to one of the discs 106. In a preferred embodiment, actuator 116 includes a voice coil motor, shown generally at 118. Disc drive 100 further includes a drive controller (not shown) which is coupled to a host system or another controller which controls a plurality of drives. In an illustrative embodiment, the drive controller is a microprocessor, or digital computer. The drive controller is either mountable within disc drive 100, or is located outside of disc drive 100 with suitable connection to actuator 116.

During operation, the drive controller receives position information indicating a track of the disc 106 to be accessed. The drive controller receives the position information from an operator, from a host computer, or from another suitable controller. Based on the position information, the drive controller provides a position signal to actuator 116. The position signal causes actuator 116 to pivot about pivot shaft 120. In an illustrative embodiment, the position signal comprises a current supplied to the voice coil motor 118, causing actuator 116 to pivot about pivot shaft 120. This, in turn, causes data head 110 to move radially over the surface of the disc 106 in a generally arcuate path indicated by arrow 122.

Figure 2:
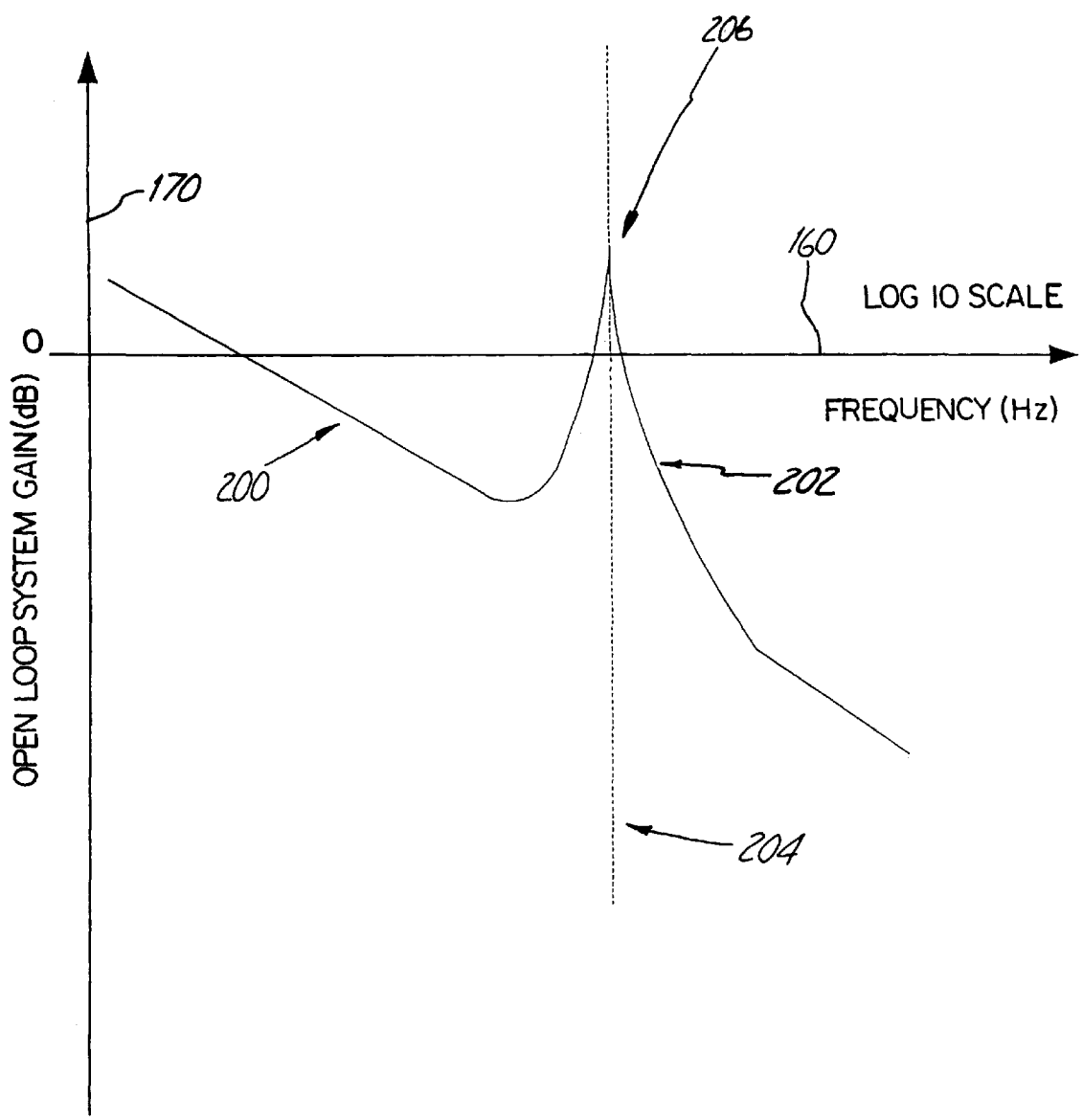
FIG. 2 is a Bode plot showing a mechanical resonance in a disc drive.

Each of the mechanical components of disc drive 100 has various resonant modes that, if excited by an external energy source, will cause the part to oscillate at the natural resonance frequencies of the component FIG. 2 is an open loop Bode plot showing a mechanical resonance in a disc drive.

For clarity's sake, the phase information has been removed from the Bode plot and the plot is not shown to scale. The x-axis 160 represents the frequency of the excitation energy, while the y-axis 170 represents the open loop system gain in decibels (dB). The open loop system gain 200 generally drops at the rate of 20 dBs per decade. However, a mechanical resonance causes a sharp increase 202 in the system gain. The resonance 202 depicted in FIG. 2 is centered at center frequency 204 and has a peak amplitude 206. A mechanical resonance could cause the servo control loop to go unstable if the phase response goes through −180° when the gain is above 0 dB. Therefor, because the peak amplitude of the gain of the resonance frequency in FIG. 2 exceeds 0 dB, the resonance could lead to control instability.

Figure 3:
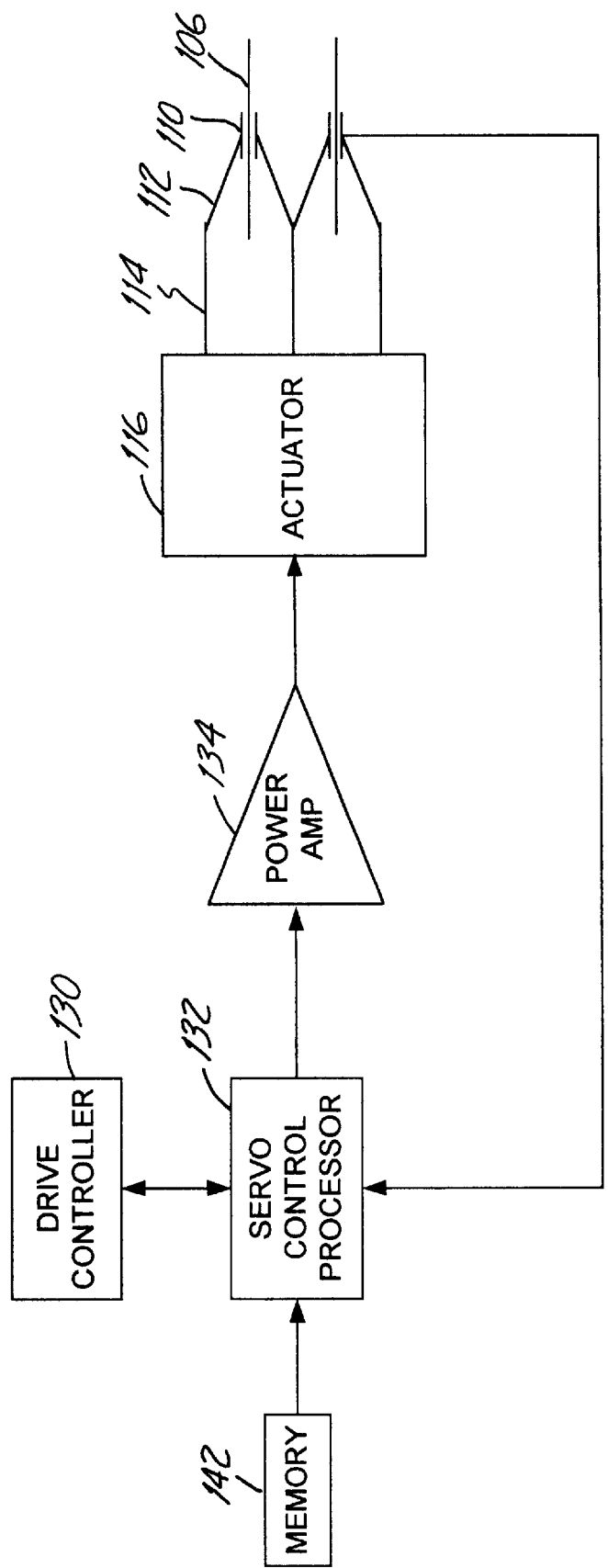
FIG. 3 is a block diagram depicting a negative feedback, closed-loop servo system according to one embodiment of the present invention.

Actuator 116 operates within a negative feedback, closed-loop servo system depicted in the block diagram of FIG. 3. Drive controller 130 receives a command signal which indicates that a certain portion of a disc 106 is to be accessed. In response to the command signal, drive controller 130 provides servo control processor 132 with a signal indicating which data head 110 is selected for reading from or writing to disc 110. Drive controller 130 also provides servo control processor with a position signal which indicates a particular cylinder over which actuator 116 is to position the data heads 110. Servo control processor 132 converts the position signal into an analog driving energy signal which is provided to actuator 116. In an illustrative embodiment, the driving energy signal is amplified by power amplifier 134, which then provides the required driving energy to actuator 116. In response to the driving energy, actuator 116 moves the data head 110 radially over the surface of the disc 106 for track seek operations and holds the data head 110 directly over a track on the disc 106 for track following operations. In an illustrative embodiment, the driving energy comprises an electrical current which is supplied to voice coil motor 118. Once the data head 110 is appropriately positioned, the drive controller executes a desired read or write operation.

Servo control processor 132 samples the position of the data head 110 and compares the actual position of the data head 110 with the desired position requested by drive controller 130. Based upon the difference between the actual position and the desired position of the data head 110, servo control processor 132 then generates a corrective driving energy signal which is provided to the actuator 116. In an illustrative embodiment, the driving energy signal is amplified by power amplifier 134, which then provides the required driving energy to actuator 116. In response to the driving energy, actuator 116 drives the data head 110 to the desired position. In an illustrative embodiment, the driving energy comprises an electrical current which is supplied to voice coil motor 118.

Figure 4:
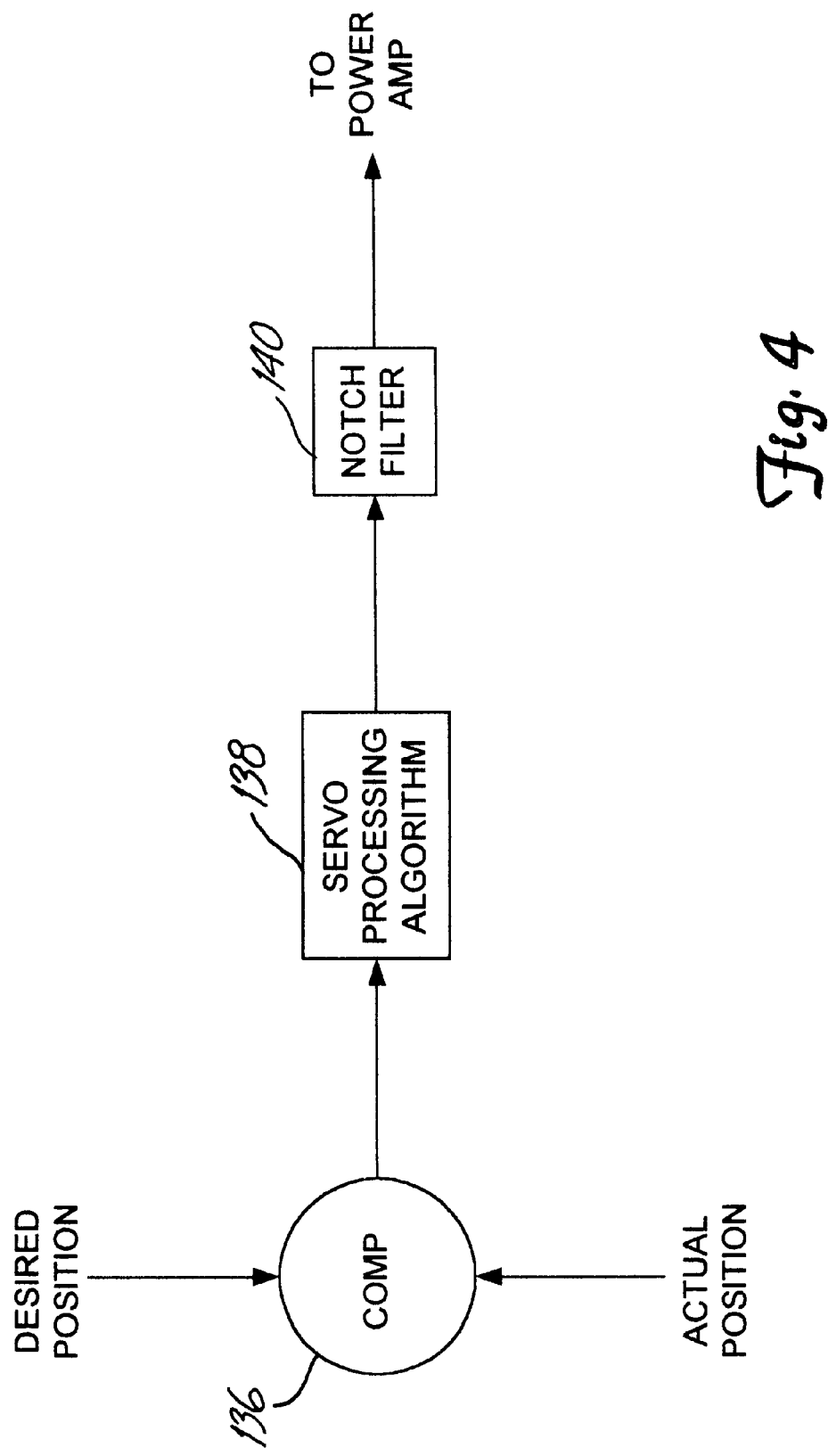
FIG. 4 is a simplified block diagram of a servo control processor according to one embodiment of the present invention.

FIG. 4 is a simplified block diagram of servo control processor 132 according to an illustrative embodiment of the present invention. Comparator 136 receives an input signal from drive controller 130 corresponding to the desired position of data head 110. Comparator 136 also receives a feedback signal from head 110 corresponding to the actual position of head 110. Based on the difference between the desired position signal and the actual position signal, comparator 136 generates a position error signal. The position error signal is provided to a servo processing algorithm 138, which generates a driving energy signal which is composed of frequency components which range from direct current (DC) to multiple kilohertz or higher. The driving energy signal is provided to digital notch filter 140, which reduces the frequency components which are at or near the resonance frequencies of the disc drive mechanical structure. The digital notch filter 140 then provides the filtered driving energy signal to actuator 116, either directly or via power amp 134. Thus, the actuator 116 can position the data head 110 at the desired location with reduced risk of exciting the disc drive mechanical structure into oscillation.

Figure 5:
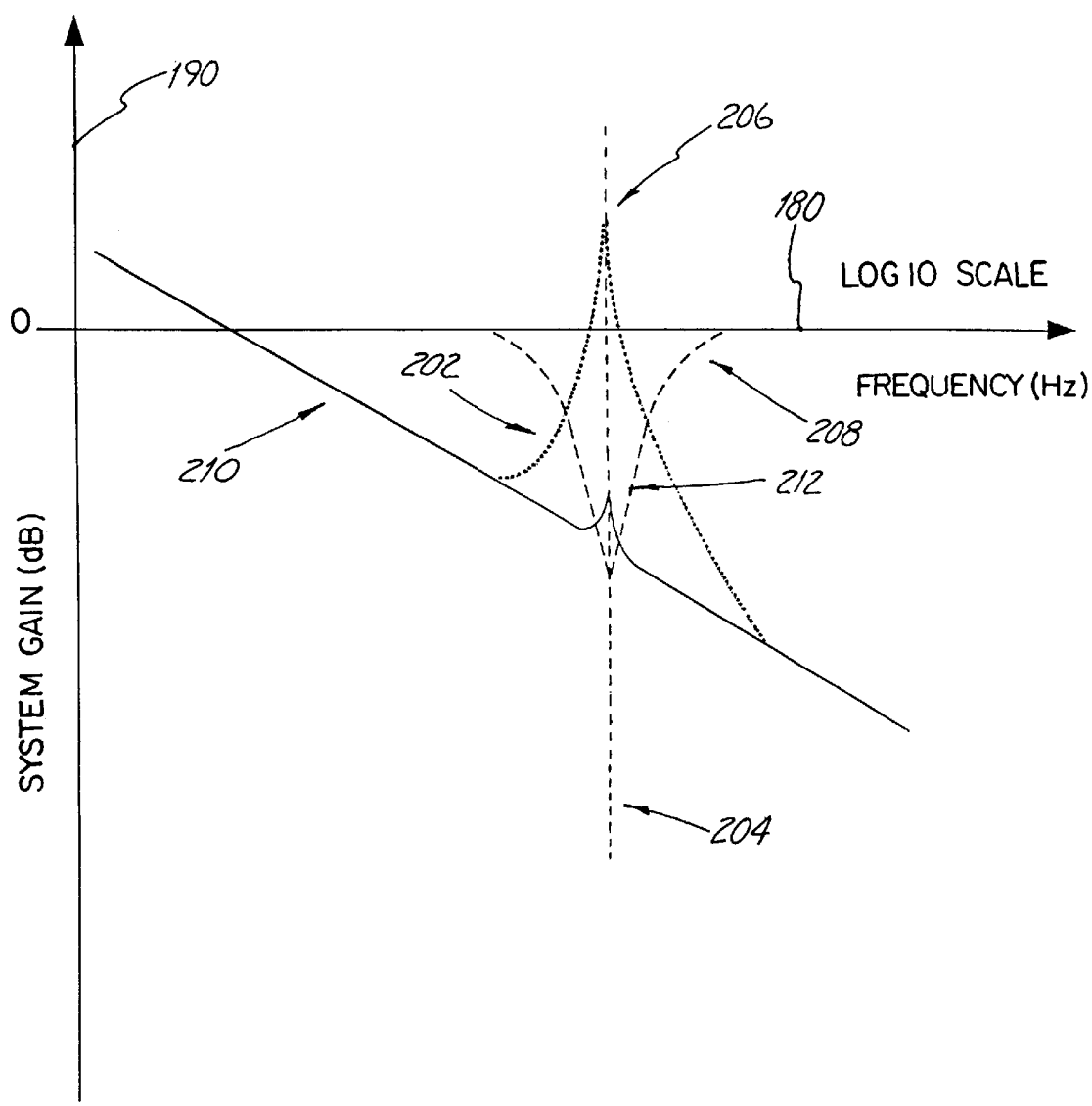
FIG. 5 is a Bode plot showing the effect of a digital notch filter according to the present invention.

The effect of notch filter 140 can be seen in the Bode plot of FIG. 5, which for clarity's sake does not show the phase response and is not shown to scale. The x-axis 180 represents the frequency of the driving energy, while the y-axis 190 represents the system gain in decibels (dB). FIG. 5 shows a mechanical resonance 202 centered at center frequency 204. Also shown is the frequency response 208 of notch filter 140. It can be seen that notch filter 140 appreciably attenuates the driving energy about the mechanical resonance 202, with the maximum attenuation occurring at the center frequency 204 of the mechanical resonance. FIG. 5 further shows the open loop frequency response 210 with notch filter 140 active. When the digital notch is activated by the servo control loop, the open loop response is a summation of the original response and the notch filter response. It can be seen that the peak amplitude 212 at center frequency 204 is now well below 0 dB. This ensures control loop stability. To ensure optimal attenuation of the driving energy, it is necessary that the notch filter response 208 be precisely centered about the center frequency 204 at which the peak amplitude 206 of the mechanical resonance 202 occurs. When the notch filter response 208 is properly centered, as in FIG. 5, the driving force energy at the center frequency 204 of the mechanical resonance 202 can be reduced so that there will be little or no energy made available to excite the mechanical structure. However, if the center frequency 204 of the mechanical resonance 202 does not align with the center frequency of the notch filter response 208, the attenuation of the driving current may not be enough to keep the structure from going into oscillation.

Various methods of implementing a digital notch filter 140 are known in the art. In an illustrative embodiment, the digital notch filter 140 implements a bilinear transfer function of the form:

$$G(z) = \frac{B_0 + B_1 z^{-1} + B_2 z^{-2}}{1 - A_1 z^{-1} - A_2 z^{-2}},$$

where G is the gain of the filter, z is the sampling rate of the servo system, and $A_1$, $A_2$, $B_0$, $B_1$ and $B_2$ are digital notch filter constants describing the frequency, depth and width of the notch. In the preferred embodiment, the digital notch filter constants are determined experimentally during the manufacture of the disc drive 100.

According to an illustrative embodiment of the present invention, a separate set of digital notch filter constants is determined for each data head 110. Although many of the mechanical resonances are similar from head to head, subtle differences can be seen in frequency, gain, phase, the width of the frequency band, or a combination of all four for any particular resonance. Because of these differences, the characteristics of an optimal notch filter 140 will vary from data head to data head. This in turn results in a variation in the optimal digital notch filter constants from data head to data head. Thus, in an illustrative embodiment, during the manufacture of the disc drive 100, the mechanical structural response is measured for each data head 110 in the disc drive 100. This is done by subjecting each data head 110 to driving energies over a wide range of frequencies and measuring the structural response at each frequency. Once the structural response has been characterized, notched filters are designed by automated manufacturing test processes and the digital notch filter constants are calculated to generate the digital notch such that the center will be exactly over the peak amplitude 206 of the resonance being analyzed.

The digital notch filter constants for each data head 110 are stored in memory 142, which is implemented as a computer data storage device, as shown in FIG. 3. Because a discrete set of digital notch filter constants is stored for each data head 110, and each data head 110 potentially has multiple resonances, this technique can result in a large number of subsets of digital notch filter constants. For example, if there are two resonances per data head 110 that have to be minimized and there are ten data heads 110 in the disc drive 100, then twenty individual subsets of notch filter constants would be required to reduce the excitation energy of the two resonances. This is not a problem with the amount of code memory available to disc drives.

Figure 6:
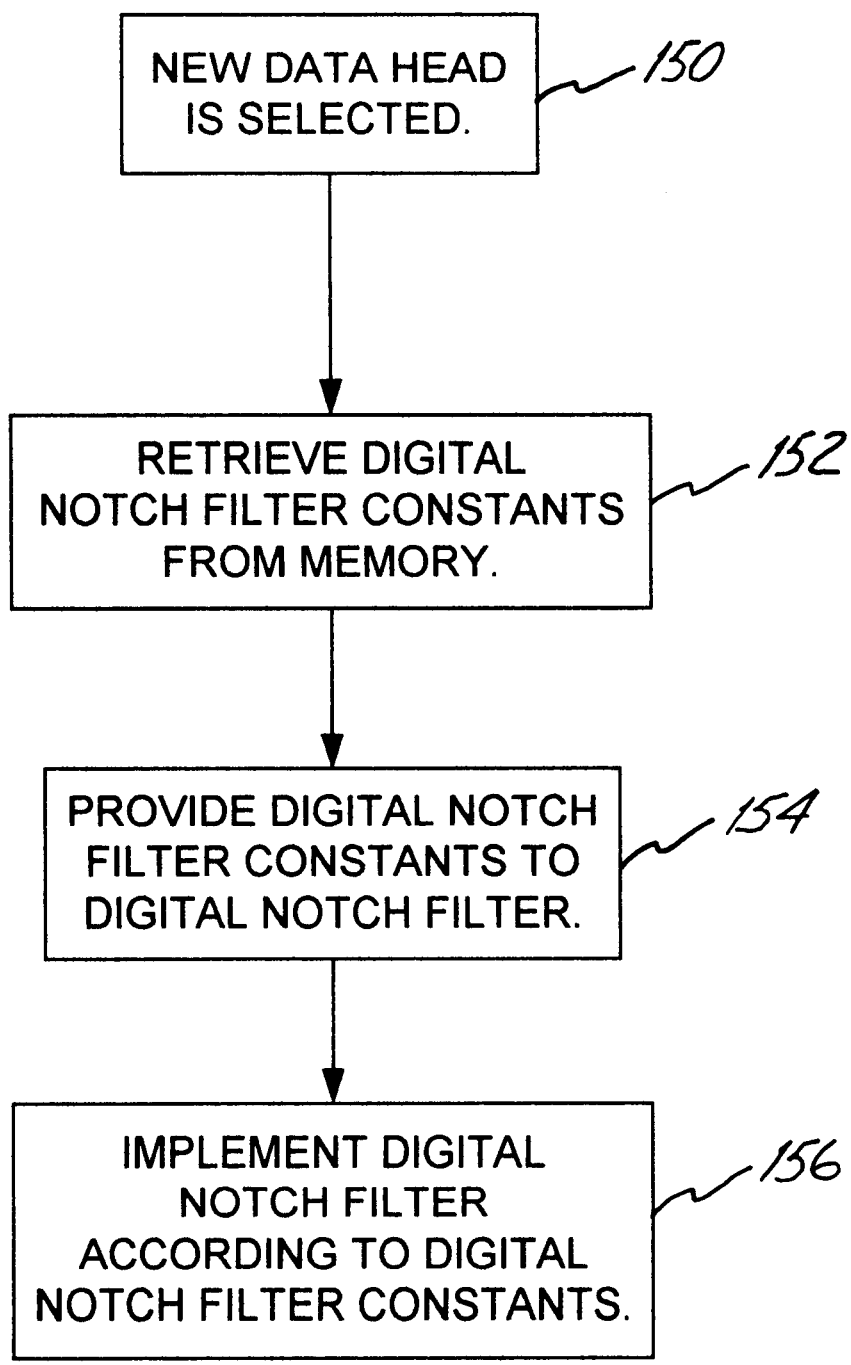
FIG. 6 is a flow chart representing a method of filtering the actuator driving energy according to the present invention.

FIG. 6 is a flow chart representing a method of filtering the actuator driving energy according to the present invention. At step 150, the drive controller 130 sends a signal to servo control processor 132 indicating that a new data head 110 is selected for performing a read, write or seek operation. Then, at step 152, servo control processor 132 retrieves the digital notch filter constants corresponding to the selected data head 110 from memory 142. At step 154, servo control processor 132 provides the digital notch filter constants to digital notch filter 140. Then, at step 156, digital notch filter 140 is implemented according to the provided digital notch filter constants. This ensures that a high degree of attenuation takes place at the mechanical resonant frequencies.

In an illustrative embodiment of the present invention, the digital notch filter constants are stored in erasable memory. This allows the digital notch filter constants to be easily changed if one or more mechanical resonances shift due to the replacement of a component of the disc drive or due to the replacement of the disc drive itself. Also, in an illustrative embodiment, the digital notch filter constants are stored in a memory location that is separate from the memory device used to store the servo control code. This embodiment has the advantage that no changes to the actual servo control code would be required should a mechanical resonance shift in frequency perhaps due to a change in component vendor.

In an alternative embodiment of the present invention, the digital notch servo constants are determined not on a head-to-head basis, but on a drive-to-drive basis. In this embodiment, a unique set of digital notch filter constants is determined for each particular disc drive 100 during the manufacture of the drives. Subtle differences in the frequency, gain, phase, and the width of the frequency band typically exist even when the drives 100 are manufactured in a substantially identical manner. These differences arise due to the tolerances of the various components of the disc drive 100. These differences result in a variation of the optimal digital notch filter constants from disc drive to disc drive. Thus, the optimal digital notch filter constants are determined and stored in memory 142. The servo control processor retrieves the digital notch filter constants and implements a digital notch filter 140 according to the digital notch filter constants. This alternative embodiment allows more precise attenuation of the resonant frequencies than is possible when all drives that are manufactured in substantially the same manner employ notch filters having identical frequency responses.

Illustratively, in this alternative embodiment of the present invention, the digital notch filter constants are stored in erasable memory. This allows the digital notch filter constants to be easily changed if one or more mechanical resonances shift due to the replacement of a component of the disc drive or due to the replacement of the disc drive itself. Also, the digital notch filter constants are illustratively stored in a memory location that is separate from the memory device used to store the servo control code. This embodiment has the advantage that no changes to the actual servo control code would be required should a mechanical resonance shift in frequency perhaps due to a change in component vendor.

In summary, one embodiment of the present invention is directed to a method of filtering the actuator driving energy to reduce the frequency components which are approximately equal to the resonance frequencies of the disc drive mechanical structure. The method involves selecting one of the data heads 110 for reading or writing and adapting the configuration of a digital notch filter 140 according to which data head 110 is selected.

In one embodiment of the present invention, digital notch filter constants for each data head 110 are stored in memory 142. The digital notch filter constants define the frequency response of a digital notch filter 140 such that the filter 140 reduces the resonance frequencies. When a particular data head 110 is selected for reading or writing, the digital notch filter constants corresponding to the selected data head 110 are retrieved from memory 142. Then, the actuator driving energy is filtered by implementing the digital notch filter 140 according to the digital notch filter constants retrieved from memory 142.

Another embodiment of the present invention is directed to a computer disc drive 100 that includes at least one disc 106, multiple data heads 110, an actuator 106, a servo control processor 132, and a digital notch filter 140. The discs 106 are capable of storing data. The data heads 110 are capable of reading data from and writing data to the discs 106. The actuator 116 is coupled to the data heads 110 for positioning the data heads 110 relative to the discs 106 in response to driving energy. The servo control processor 132 is coupled to the actuator 116 and is capable of providing driving energy to the actuator 116. The digital notch filter 140 reduces the frequency components of the driving energy which are close to the resonant frequencies of the disc drive mechanical a structure. The servo control processor 132 adjusts the configuration of the digital notch filter 140 according to which data head 110 is selected.

One embodiment of a disc drive 100 according to the present invention includes a data storage device 142 that is accessible by the servo control processor 132 and stores digital notch filter constants which define the frequency response of the digital notch filter 140 for each data head. The servo control processor 132 retrieves the digital notch filter constants corresponding to a newly selected data head 110 from the data storage device 142 when the data head 110 is selected for reading or writing and provides the digital notch filter constants to the digital notch filter 140.

Yet another embodiment of the present invention is directed to a disc drive 100 that includes an actuator 116 that is driven by driving energy, and means for filtering the driving energy to reduce the frequency components which are substantially equal to the resonance frequencies of the disc drive mechanical structure.

It is to be understood that even though numerous characteristics and advantages of various embodiments of the present invention have been set forth in the foregoing description, together with details of the structure and function of various embodiments of the invention, this disclosure is illustrative only, and changes may be made in details, especially in matters of structure and arrangement of parts within the principles of the present invention to the full extent indicated by the broad general meaning of the terms in which the appended claims are expressed. For example, with reference to FIGS. 3 and 4, notch filter 140 can be implemented as a component that is separate from servo control processor 132. Also, with reference to FIG. 3, notch filter 140 can be positioned between power amp 134 and actuator 116. Other modifications can also be made.

What is claimed is:

1. In a disc drive having an actuator driven by driving energy for positioning a plurality of data heads relative to at least one disc and a digital notch filter adapted to minimize specified frequency components of the actuator driving energy, wherein resonance frequencies of the disc drive mechanical structure are known for each data head, a method of filtering the actuator driving energy to reduce the frequency components which are within a predetermined range of the resonance frequencies of the disc drive mechanical structure, comprising steps of:
   (a) selecting one of the plurality of data heads for reading or writing; and
   (b) adapting the configuration of the digital notch filter according to which of the plurality of data heads is selected for reading or writing.

2. The method of claim 1 wherein digital notch filter constants defining a frequency response of the digital notch filter which reduces the resonance frequencies to a desired extent are known for each data head, wherein the adapting step (b) comprises steps of:
   (b)(i) storing the digital notch filter constants corresponding to each data head in memory;
   (b))(ii) when a particular data head is selected for reading or writing, retrieving from memory the digital notch filter constants corresponding to the selected data head; and
   (b)(iii) filtering the actuator driving energy by implementing the digital notch filter according to the digital notch filter constants retrieved from memory.

3. The method of claim 2 wherein the actuator comprises a voice coil motor and the driving energy comprises electrical current supplied to the voice coil motor, and wherein the filtering step (b)(iii) comprises filtering the electrical current by implementing the digital notch filter according to the digital notch filter constants retrieved from memory.

4. The method of claim 2 wherein the storing step (b)(i) comprises storing the digital notch filter constants corresponding to each data head in erasable memory.

5. The method of claim 4 wherein the disc drive includes servo code, stored by a first memory device, for controlling positioning of the data heads and wherein the storing step (b)(i) comprises storing the digital notch filter constants corresponding to each data head in a second memory device, thereby permitting access to the digital notch filter constants without accessing the servo code.

6. The method of claim 2 wherein the actuator is controlled by a servo control system and where the filtering step (b)(iii) comprises implementing a bilinear transfer function of the form:

$$G(z) = \frac{B_0 + B_1 z^{-1} + B_2 z^{-2}}{1 - A_1 z^{-1} - A_2 z^{-2}},$$

where G is the gain of the filter, z is the sampling rate of the servo system, and $A_1$, $A_2$, $B_0$, $B_1$ and $B_2$ are digital notch filter constants describing the frequency, depth and width of the frequency response of the digital notch filter.

7. The method of claim 2, further comprising a step, prior to filtering step (b)(iii), of providing the retrieved digital notch filter constants to the digital notch filter.

8. The method of claim 2, further comprising a step, prior to filtering step (b)(iii), of amplifying the actuator driving energy.

9. A disc drive comprising:
   at least one disc adapted to store data;
   a plurality of data heads, each adapted to read data from and write data to the at least one disc;
   an actuator coupled to the plurality of data heads and adapted to controllably position the plurality of data heads relative to the at least one disc in response to actuator driving energy;
   a digital notch filter adapted to reduce the frequency components of the actuator driving energy which are substantially equal to resonant frequencies of the disc drive; and
   a servo control processor coupled to the actuator and adapted to controllably provide the driving energy to the actuator, wherein the servo control processor adjusts the configuration of the digital notch filter according to which of the plurality of data heads is selected for reading or writing.

10. The disc drive of claim 9, further comprising a computer data storage device accessible by the servo control processor, wherein the computer storage device stores digital notch filter constants which define the frequency response of the digital notch filter for each data head and wherein the servo control processor retrieves the digital notch filter constants corresponding to a newly selected data head from the computer data storage device when the data head is selected for reading or writing and provides the retrieved digital notch filter constants to the digital notch filter.

11. The disc drive of claim 10 wherein the actuator comprises a voice coil motor and wherein the driving energy comprises electrical current.

12. The disc drive of claim 10 wherein the computer data storage device comprises an erasable data storage device.

13. The disc drive of claim 10 wherein the digital notch filter is implemented according to a bilinear transfer function of the form:

$$G(z) = \frac{B_0 + B_1 z^{-1} + B_2 z^{-2}}{1 - A_1 z^{-1} - A_2 z^{-2}},$$

where G is the gain of the filter, z is the sampling rate of the servo system, and $A_1$, $A_2$, $B_0$, $B_1$ and $B_2$ are digital notch filter constants describing the frequency, depth and width of the frequency response of the digital notch filter.

14. The disc drive of claim 10, further comprising a power amplifier adapted to amplify the driving energy.

15. The disc drive of claim 14 wherein the power amplifier amplifies the driving energy after the driving energy is filtered by the digital notch filter.

16. The disc drive of claim 14 wherein the power amplifier amplifies the driving energy before the driving energy is filtered by the digital notch filter.

17. The disc drive of claim 10 further comprising a drive controller coupled to the servo control processor and adapted to transmit information to the digital servo processor, the information including information regarding the selection of one of the plurality of data heads for reading or writing.

18. The disc drive of claim 10 wherein the digital notch filter is incorporated within the servo control processor.

* * * * *